US008332429B2

(12) United States Patent
Poirier et al.

(10) Patent No.: US 8,332,429 B2
(45) Date of Patent: Dec. 11, 2012

(54) PHOTOGRAPHY ASSISTANT AND METHOD FOR ASSISTING A USER IN PHOTOGRAPHING LANDMARKS AND SCENES

(75) Inventors: Hervé Poirier, Meylan (FR); Florent Perronnin, Domène (FR); Mario Agustin Ricardo Jarmasz, Meylan (FR)

(73) Assignee: Xerox Corporation, Norwalk, CT (US)

( * ) Notice: Subject to any disclaimer, the term of this patent is extended or adjusted under 35 U.S.C. 154(b) by 144 days.

(21) Appl. No.: 12/820,647

(22) Filed: Jun. 22, 2010

(65) Prior Publication Data

US 2011/0314049 A1    Dec. 22, 2011

(51) Int. Cl.
G06F 7/00    (2006.01)
(52) U.S. Cl. ....................................................... 707/781
(58) Field of Classification Search ................... 707/781
See application file for complete search history.

(56) References Cited

U.S. PATENT DOCUMENTS

| | | | |
|---|---|---|---|
| 2003/0169350 A1 | 9/2003 | Wiezel et al. | |
| 2006/0232685 A1* | 10/2006 | Takemoto | 348/223.1 |
| 2007/0005356 A1 | 1/2007 | Perronnin | |
| 2007/0258648 A1 | 11/2007 | Perronnin | |
| 2008/0069456 A1 | 3/2008 | Perronnin | |
| 2008/0317358 A1 | 12/2008 | Bressan et al. | |
| 2009/0144033 A1 | 6/2009 | Perronnin et al. | |
| 2009/0232409 A1 | 9/2009 | Marchesotti | |
| 2010/0040285 A1 | 2/2010 | Csurka et al. | |
| 2010/0074613 A1* | 3/2010 | Masuno et al. | 396/661 |
| 2010/0092084 A1 | 4/2010 | Perronnin et al. | |
| 2010/0098343 A1 | 4/2010 | Perronnin et al. | |

OTHER PUBLICATIONS

U.S. Appl. No. 12/512209, Perronnin, et al.
Zheng, et al. "Tour the World: Building a web-scale landmark recognition engine," IEEE Computer Society Conference on Computer Vision and Pattern Recognition, p. 1085-1092 (2009).
Jegou, et al. "Improving Bag-Of-Features for Large Scale Image Search," in IJCV, vol. 87, 3, p. 191-212 (2010).
Perronnin, et al. "Adapted Vocabularies for Generic Visual Categorization," in *European Conf. on Computer Vision*,(2006).
Bosch, et al. "Scene Classification via pLSA," in *ECCV*(2007).
Quelhas, et al. "Modeling Scenes with Local Descriptors and Latent Aspects," in *ICCV*(2005).
Csurka, et al. "Visual Categorization with Bags of Key-points," in *ECCV Workshop on Statistical Learning for Computer Vision*(2004).
Carbonetto, et al. "A Statistical Model for General Contextual Object Recognition," in *ECCV*(2004).
*Flickr Nikon Digital Learning Centre Group*,Flickr (2009) www.flickr.com/groups/nikondigitallearningcenter/.
Mobile Augmented Reality Browser, http://layar.com.
Digital Photography Tips, Adobe Systems (2008) http://www.adobe.com/education/instruction/adsc/pdf/digital_photo_tips.pdf.
"Photo Tips & Techniques," Kodak (2009) http://www.kodak.com/eknec/PageQuerier.jhtml?pg-path=39&pg-locale=en_US&_requesti=3715.

* cited by examiner

*Primary Examiner* — Truong Vo
(74) *Attorney, Agent, or Firm* — Fay Sharpe LLP

(57) ABSTRACT

A method and system to help photographers to take better quality pictures of landmarks and scenes are disclosed. A user is guided with examples of existing quality images, which are extracted from a database, of the same or similar landmarks or scenes. The method includes taking a query photograph that may include an image associated with a GPS location and other metadata, and using information extracted from the image to retrieve existing, similar images. The images retrieved may be ordered according to different criteria. When a user selects one as a model image, the user is provided with assistance for taking a target photograph of similar quality.

30 Claims, 7 Drawing Sheets

PHOTOGRAPHY ASSISTANT AND METHOD FOR ASSISTING A USER IN PHOTOGRAPHING LANDMARKS AND SCENES

BACKGROUND

The exemplary embodiment relates to fields of image processing. It finds particular application in connection with the provision of feedback on optically captured images, and is described with particular reference thereto. However, a more general application can be appreciated with regards to image classification, image content analysis, image archiving, image database management and searching, and so forth.

Photographers are now using digital image capture devices, such as cameras, cell phones, and optical scanners, to capture images in digital format. The captured images are often sent to photofinishing services or content-sharing communities. Regardless of the final medium in which the images will be managed, shared and visualized, the quality expectations of users are growing. Many amateurs and professionals, for example, share their best pictures through photo sharing sites.

Digital photography allows shooting many pictures and viewing them immediately, but does not necessarily improve photographic skills. Acquisition conditions, user expertise, compression algorithms and sensor quality can seriously degrade the final image quality. In particular, the amateur photographer does not necessarily appreciate that changes in shooting techniques could avoid similar image degradations in the future and allow for better enhancement thereafter. Perceiving the quality of a digital image is in general a difficult exercise for non-expert users. In particular, it is not easy to spot specific degradations (e.g., low contrast vs. low saturation, incorrect white balance, and the like) or to understand how these degradations could have been avoided at the time the photo was taken. Additionally, amateur photographers may not understand how image composition can affect visual appeal.

INCORPORATION BY REFERENCE

The following references, the disclosures of which are incorporated herein in their entireties by reference, are mentioned:

U.S. Pub. No. 2007005356, published Jan. 4, 2007, entitled GENERIC VISUAL CATEGORIZATION METHOD AND SYSTEM, by Florent Perronnin, discloses techniques for classifying images based on class visual vocabularies constructed by merging a general visual vocabulary with class-specific visual vocabularies.

U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin, discloses an image classification system with a plurality of generative models which correspond to a plurality of image classes. Each generative model embodies a merger of a general visual vocabulary and an image class-specific visual vocabulary. A gradient-based class similarity modeler includes a model fitting data extractor that generates model fitting data of an image respective to each generative model and a dimensionality enhancer that computes a gradient-based vector representation of the model fitting data with respect to each generative model in a vector space defined by the generative model. An image classifier classifies the image respective to the plurality of image classes based on the gradient-based vector representations of class similarity.

U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin, discloses an image classification method in which images are described in terms of a bag of visual words.

U.S. Pub. No. 20080317358, published Dec. 25, 2008, entitled CLASS-BASED IMAGE ENHANCEMENT SYSTEM, by Marco Bressan, et al., discloses enhancing an image based on a class to which the image is assigned.

U.S. Pub. No. 20090232409, published Sep. 17, 2009, entitled AUTOMATIC GENERATION OF A PHOTO GUIDE, by Luca Marchesotti, discloses generating a photo guide with a user's images accompanied by tips for improving photographs.

U.S. Pub. No. 20100092084, published Apr. 15, 2010, entitled REPRESENTING DOCUMENTS WITH RUN-LENGTH HISTOGRAMS, by Florent Perronnin, Damien Cramet, and Francois Ragnet, discloses an apparatus and method for generating a representation of an image which may be used in tasks such as classification, clustering, or similarity determination.

U.S. Pub. No. 20100040285, published Feb. 18, 2010, by Gabriela Csurka and Florent Perronnin, discloses an automated image processing system and method for class-based segmentation of a digital image.

U.S. Pub. Nos. U.S. Pub. No. 20090144033 published Jun. 4, 2009, and 20100098343, published Apr. 22, 2010, by Florent Perronnin and Yan Liu, disclose systems and methods for generating an image representation. In 20090144033 a universal mixture model including a plurality of universal mixture model components is adapted to a first object to generate a first object mixture model including a plurality of first object mixture model components having one to one correspondence with the plurality of universal mixture model components. A component-by-component comparison is performed of the plurality of first object mixture model components and a plurality of second object mixture model components obtained by adaptation of the universal mixture model to a second object and having one to one correspondence with the plurality of first object mixture model components. A similarity measure is generated for the first and second objects based on the component by component comparison. In 20100098343, the image is modeled as a set of mixture weights, one for each of a set of reference image models, such as Gaussian mixture models.

U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin and Hervé Poirier, discloses an apparatus and method for comparing images based on image signatures. The image signatures are each based on a respective set of vectors in a vector space. A vector set comparison measure is computed, based on the first and second image signatures.

Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009 (hereinafter "Zheng, et al."), discloses a method for building a recognition engine for landmarks.

Herve Jegou, Matthijs Douze, and Cordelia Schmid, "Improving Bag-Of-Features for Large Scale Image Search,"

in IJCV, 2010 (hereinafter "Jegou, et al."), discloses method for large scale image search by analyzing the bag-of-features approach.

BRIEF DESCRIPTION

In accordance with one aspect of the exemplary embodiment, a method for assisting a user in taking photographs includes receiving a query photograph including an image, optionally with associated metadata, and with a processor, extracting an image signature from the query photograph based on content related features of the image. A database of photographs is queried, based on the image signature, to retrieve photographs, each comprising an image similar to the image of the query photograph. At least a subset of the retrieved photographs is presented for the user to select a model photograph from among the presented photographs. Based on a user-selected model photograph, instructions are generated for taking a target photograph and the instructions presented to the user for taking the target photograph.

In accordance with another aspect, a system for assisting a user in taking photographs includes memory which stores a user selection component for receiving a user's selection of a query photograph and of a model photograph, an image shuttle for transferring the query photograph, optionally with associated metadata, to an associated query system for querying a database, based on an image signature extracted from the query image, and for receiving images retrieved from the database in response to the query. A display generator is provided for generating a display of at least a subset of the retrieved images on an associated display device from which the model photograph is selected. An instruction generator is configured to present instructions to the user for taking a target photograph based on the selected model photograph. A processor in communication with the memory is provided for implementing the user selection component, image shuttle, display generator, and instruction generator.

In accordance with another aspect, a method for assisting a user in taking photographs is executed by at least one processor with at least one memory storing executable instructions for performing the method. The method includes receiving a selected query photograph comprising at least one image, optionally with corresponding metadata, retrieving photographs from a database based on a comparison of the information extracted from the query photograph with information extracted from photographs in the database. At least a subset of the retrieved photographs is presented for the user to select a model photograph therefrom. A selection of a model photograph from among the presented photographs is received, and instructions are generated to guide the user for taking a target photograph having a similar quality to the selected model photograph.

DETAILED DESCRIPTION

Aspects of the exemplary embodiment relate to a system and method for providing photography assistance through a user interface of an optical image capturing device, such as a digital camera, mobile phone, or the like. The exemplary user interface includes an image assistance component that assists the user in transferring a digital image captured on the image capture device by a user (e.g., an amateur photographer) to the user interface, and in presenting similar images retrieved by querying an image database. In the exemplary method, an image signature is extracted from the image, which is representative of features of the image content, and is used in the selection of similar images. Other features related to the perceptual quality of the image, and associated metadata (e.g., GPS location) may also be employed in selection of similar images. The exemplary system and method are particularly suited to retrieving images of landscapes and/or well known scenes, which are likely to be present in the database, although other types of images are also contemplated. The user selects a model photograph that is desirable in quality from among the similar images retrieved. The model photograph selected is received by the interface system and then used to provide the user with guidance for capturing a target photograph of similar quality to the model photograph selected.

A digital image includes image data for each pixel of a generally two-dimensional array of pixels. The image data may be in the form of gray scale values, where gray can refer to any color separation, or any other graduated intensity scale. While particular reference is made herein to the images being photographs, it is to be appreciated that other digitally acquired images, such as images acquired by an optical scanner, may be similarly processed.

Figure 1:
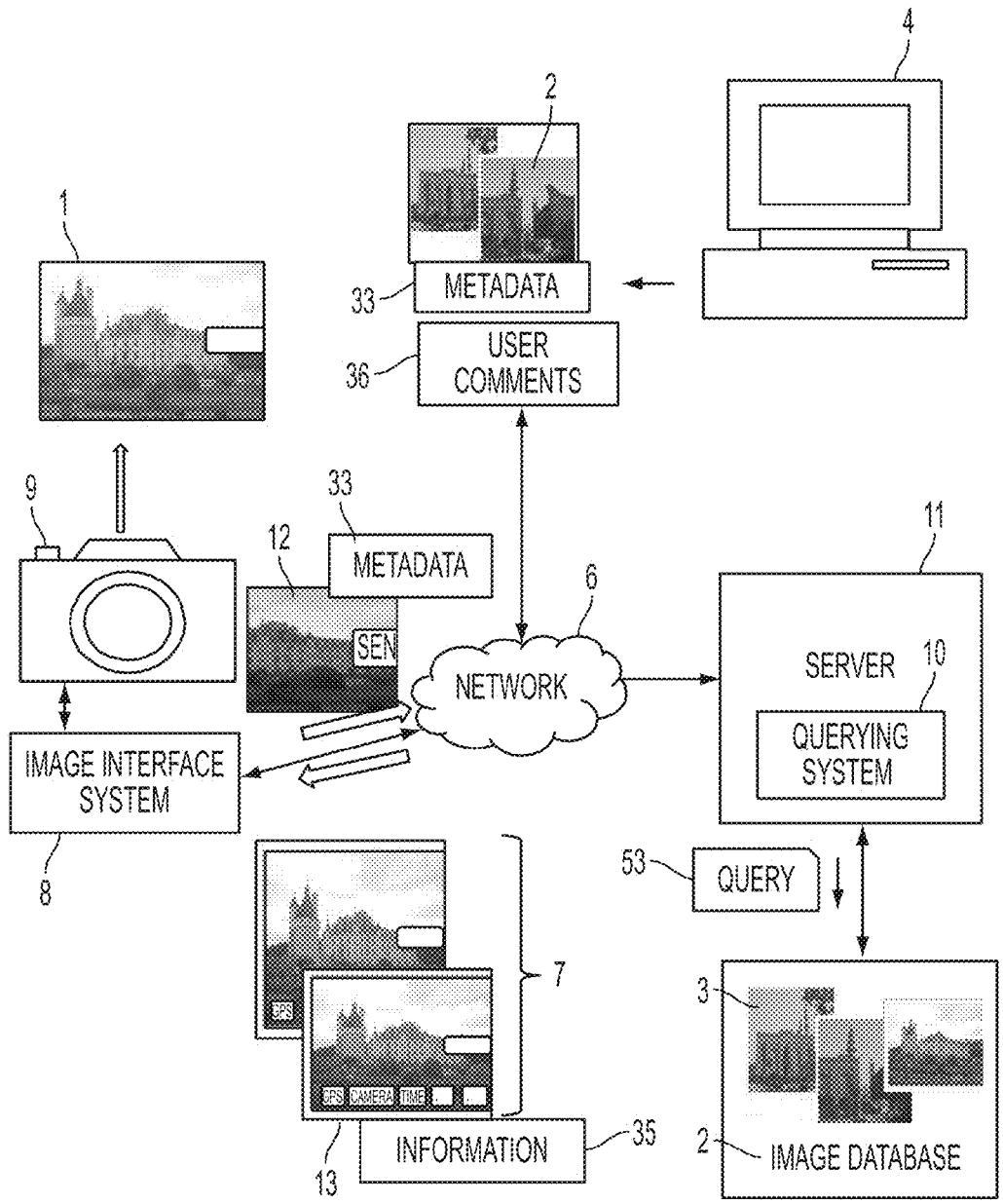
FIG. 1 is a functional block diagram of an overview for generation of a target photograph in accordance with one aspect of the exemplary embodiment.

FIG. 1 illustrates a brief overview of an exemplary method and system for generating a target photograph 1. The system and method rely on a database 2 of images 3, such as photographs. The images may be shared resources, such as photographic images of landmarks and scenes, shared by a sharing client 4 on behalf of an image provider via a wired or wireless network 6 such as a local area network or wide area network, such as the Internet. A subset 7 of the images 3 may be retrieved from the database 2 and presented to a user through an image interface system 8 in response to a query. The interface system 8 may be resident on or associated with an image capture device 9 or other client device that is capable of accessing a querying system 10, which in the exemplary embodiment is hosted by a remote computer device 11, here shown as a server, by way of the network 6. The illustrated image capture device 9 is a camera, although other devices with image capturing capability are also contemplated, such as a mobile phone, PDA, laptop computer, or the like. The subset 7 of images is presented to a user on the receiving client device 9.

The interface system 8 takes as input a first original digital image 12 (a query image), which has been captured by the user on the image capture device 9. In the exemplary embodiment, the image 12 includes, as digital content, a landmark or scene which the user would like to retake with a view to producing a better quality image (target image 1). Information extracted from the image 12 is used to query the database 2 and retrieved similar images 7. In particular, the interface 8 submits the query image 12 (or information extracted therefrom) to the querying system 10, which queries the database 2. The querying involves comparing the information extracted from the query image 12 with similarly information extracted from the database images 3. Similar images 7, i.e., images whose information is determined to be similar to that of the query image, which may respectively include images, such as landmarks and/or scenes, are retrieved from the database 2 and sent, e.g., as reduced resolution images ("thumbnails"), together with associated information, via the network 6 to the user interface 8.

The information extracted from the query image 12 and database images 2 may include metadata and an image signature, which is representative of the content of the image are used in the query. The information for the query image 12 is compared to the information of images 3 in the database 2. Upon retrieving similar images 7 together with metadata associated with them, the images 4 are displayed by the user interface 8 to the user. A selection made by a user is received by the interface 8, indicating a favorite photograph 13 which serves a model photograph. The selected photograph 13 is thus one for which the user desires to take a target photograph 1 which is similar in quality. An instructional guide (not shown) is generated to guide the user to take the target photograph 1, with an expectation that it will be of higher quality than the query photograph 12, e.g., similar to the model photograph 13 selected.

Figure 2:
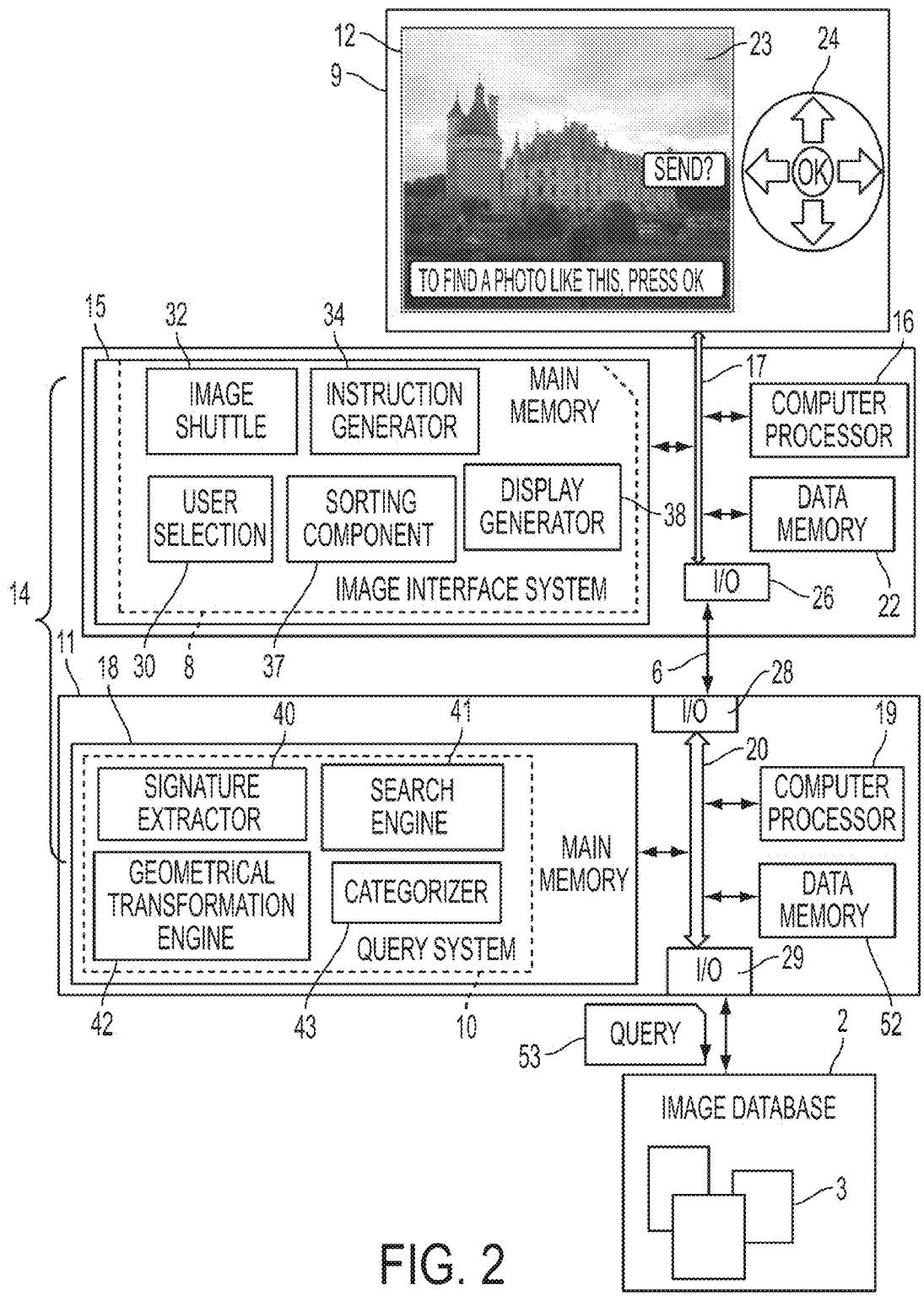
FIG. 2 is an illustration of a system for guiding a user in taking a target photograph in accordance with one aspect of the exemplary embodiment.

With reference also to FIG. 2, an exemplary assistance system 14, which includes the image interface system 8 and query system 10 of FIG. 1, is illustrated.

The image interface system 8 may be hosted by any digital photograph processing device 9, such as one or more digital cameras or any other image capturing device that is communicatively linked to the server 11 for querying the database 2 of images. The interface 8 and query system 10 may be embodied in hardware or a combination of hardware and software. In the exemplary embodiment, the interface system 8 includes software instructions stored in main memory 15, which are executed by an associated processor 16, such as the capture device 9's CPU, in communication with main memory 15, e.g., via a data control bus 17.

Similarly, the query system 10 may include software instructions stored in main memory 18, which are executed by an associated computer processor 19, such as the server 11's CPU, in communication with main memory 18, e.g., via a data control bus 20.

For convenience, the software instructions of systems 8 and 10 are described in terms of a set of software components, although it will be appreciated that some components may be combined or split into subcomponents. Additionally, while some of the software components are shown as being resident on the interface 8 or server 11, respectively, it is to be appreciated that the locations of these components may be distributed among the interface and server in other suitable arrangements. To minimize the memory storage required by the capture device 9, it is convenient to have most of the components for executing the exemplary method located on the server 11, although in other embodiments, different distributions may be desired.

The interface system 8 receives, as input, a query image 12, such as a photograph, to be processed. The image 12 received may be a captured photograph, for example, taken by a user, such as an amateur photographer. During processing, the image 12 may be stored in data memory 22 of the interface 8, such as the camera's removable memory card, which is accessible to the processor 16. Memory 22 can be incorporated into memory 15 or may be separate therefrom. The interface system 8 communicates with a display 23, such as the display of the image capture device 9. A user can select an image to be submitted to system 8 using appropriate controls 24 of the image capture device, such as a touch screen, selection buttons, combinations thereof, or the like. The display 23 and user operable controls 24 thus serve as a graphical user interface in communication with interface system 8. The interface system 8 communicates with external devices, such as server 11, via a network interface 26. Query system 10 may be similarly provided with one or more network interfaces 28, 29.

Digital images 12 are generally photographic images or images derived therefrom. The methods are particularly applicable to images of natural scenes, such as indoor and outdoor scenes, and pictures of landmarks. The images to be processed by the system 14 can be in any selected format, such as JPEG, GIF, BMP, TIFF, or the like. If appropriate, an image format converter (not shown) can be used to convert the inputted images to a suitable format for processing. Metadata associated with the images can similarly be processed by the system 14 and be stored in the image, such as an EXIF part of the image, or other similar dimension. The images can be black and white images, color images, or some combination thereof, and can have any suitable resolutions (for example, measured in pixels-per-inch).

The components of the interface system 8 and query system 10 will be best understood with reference to the exemplary method discussed below and will be described only briefly here. In particular, the system 8 includes a user selection component 30 which receives the user's selection of an image 12. An image shuttle 32 transfers the image(s) 12 to the query system 10, together with metadata 33 respectively associated with the images. Metadata transferred to the system 10 can include GPS location, camera model, settings of the camera, time/date information, and/or any image information associated with the digital image 12. An instruction generator 34 generates instructions for reproducing the selected image 13, based on information 35 associated with the image 12, such as metadata and comments 36 of the image supplier (FIG. 1). A sorting component 37 sorts/orders the received images 7, e.g., based on a user selection of one or more of a set of ranking criteria. A display generator 38 displays the instructions for reproducing the selected image 13 on the display 23.

The software components of the query system 10 may include a signature extractor 40 for extracting a signature representative of the image 12 from the image content, a search engine 41 a geometrical transformation engine 42, and a categorizer 43, which are explained in greater detail below.

Figure 3:
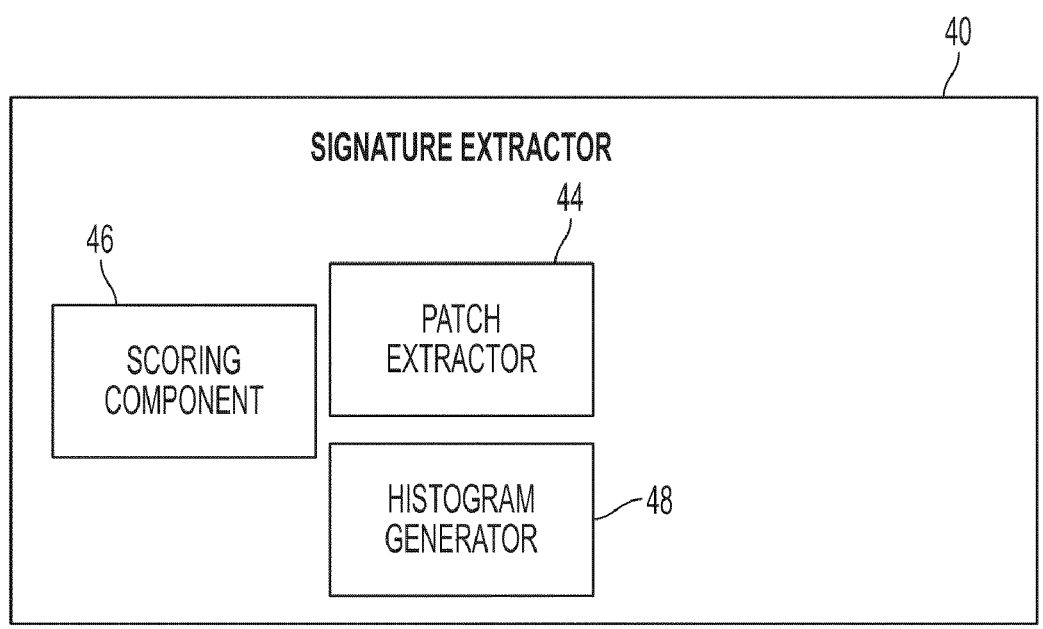
FIG. 3 is a functional block diagram of the signature extractor of the system of FIG. 2 in accordance with another aspect of the exemplary embodiment.

The signature extractor 40 transforms an image into a representation which characterizes the image content, such as a vectorial representation. The purpose of extracting a signature is to characterize the image in a way which facilitates comparison of images and can be achieved in a variety of ways. For example, as shown in FIG. 3, the signature extractor 40 comprises a patch extractor 44, which extracts and analyzes content related features of patches of the image 12 received, such as shape, texture, color, or the like. The patches may be selected on a grid or according to areas of interest. In general, the extractor 44 provides generic descriptions about the visual content of the input images.

In one embodiment, the signature generation includes a bag of visual word (BOV) based approach. In this approach, the image 12 is characterized by a histogram of visual word counts. The visual vocabulary is built automatically from a training set of images. To do this, some image descriptors are extracted from the image patches. Those descriptors are generally based on texture, color, shape, structure, or their combination and are extracted locally on patches, such as regions of interest (ROI). The patches can be obtained by image segmentation, by applying specific interest point detectors, by considering a regular grid, or simply by random sampling of image patches. For example, histograms of gradients may be computed on each region. All features extracted can then be mapped to the feature space and clustered to obtain the visual vocabulary. Often a simple K-means is used, however Gaussian Mixture Models (GMMs) (see, Perronnin, F., Dance, C., Csurka, G., and Bressan, M., "Adapted Vocabularies for Generic Visual Categorization," in *European Conf. on Computer Vision*, (2006)) can also be used to obtain a soft clustering, in-line with the continuous nature of visual words. For examples of methods for mixing image models as Gaussian mixture models see above-mentioned U.S. Pub No. 20100098343, the disclosure of which is incorporated herein by reference.

Given a new image 12 to be assigned a signature, each feature vector is assigned to its closest visual word in the previously trained vocabulary or to all visual words in a probabilistic manner in the case of a stochastic model. The histogram is computed by accumulating the occurrences of each visual word.

For other examples methods for generating image signatures based on image content, see, e.g., Jegou, et al. U.S. Pub. No. 20080069456; above-mentioned U.S. application Ser. No. 12/512,209, and references cited therein; Csurka, G., Dance, C., Fan, L., Willamowski, J., and Bray, C., "Visual Categorization with Bags of Key-points," in *ECCV Workshop on Statistical Learning for Computer Vision* (2004); Quelhas, P., Monay, F., Odobez, J.-M., Gatica-Perez, D., Tuytelaars, T., and Gool, L. V., "Modeling Scenes with Local Descriptors and Latent Aspects," in *ICCV* (2005), and Carbonetto, P., de Freitas, N., and Barnard, K., "A Statistical Model for General Contextual Object Recognition," in *ECCV* (2004) (hereinafter Carbonetto 2004).

The database 2 may be queried by the search engine 41 to identify responsive images with an identifying signature corresponding closely to that of the query image. Upon extracting a signature from the query image, the signature is compared to signature of images within the image database 2. For example, as described in U.S. application Ser. No. 12/512,209, a vector set comparison measure may be computed, based on the first and second image signatures and the highest-scoring images in the database identified by the comparison are retrieved.

In selecting the best images of those retrieved to present to the user, a quality score associated with responsive images may also be considered. This score may be generated by a community of users of the database. Additional post-processing of the images, such as geometry verification, can also be applied by a geometrical transformation engine 42 to increase retrieval accuracy from the query for the similar images 7.

During processing, the image 12 may be stored in memory 52 together with its signature and metadata that is indexed accordingly.

When the query system 10 queries the image database 2, additional information (e.g., metadata 33) together with the signature extracted from the query image 12 is sent as part of the query 53 to guide the retrieval process. For example, a GPS location, camera information, time of day information or a maximum number of similar images to be returned, or any other associated information for the query can be sent. The output of the query is the set of most similar images 7 that (ideally) represent the same scene and/or landmark as the query image 12.

In one embodiment, the similar images 7 are retrieved with a quality indication associated therewith, such as a quality score, for sorting images accordingly. When a list of similar images 7 retrieved is too long, a subset of the images may be returned. For example, a certain number of images may be returned, which were taken from a location closest to the user, or only a particular number of images with a quality score that is above a predetermined threshold (e.g., images of the highest quality), or some combination of selection criteria may be applied. In an embodiment, the retrieved similar images 7 are sent to the interface system 8 along with information 35, such as the GPS information where the image was taken, metadata such as the camera information, and/or time/date information in which the respective image was taken, and optionally provider comments 36, or information extracted therefrom. These images 7, or at least a subset thereof, may then be displayed to a user by the interface system 8 to enable a selection to be made for a selected image 13 to be used as a model image.

The display device 23 is configured to display the similar images 7 to a user. The system 14 is not confined to one particular interface 8 and may comprise multiple display devices 23. In presenting the similar images 7 retrieved from the query on the display device 23, the sorting component 37 may be configured to sort the images in specific arrangements. Ordering/sorting of the images 7 retrieved from the server 11 for presentation to the user can be performed at the photograph device (e.g., a digital camera) comprising the image interface system 8 or on the server side when an index listing of the images is built. The images 7 may be arranged according to many different criteria.

Figure 4:
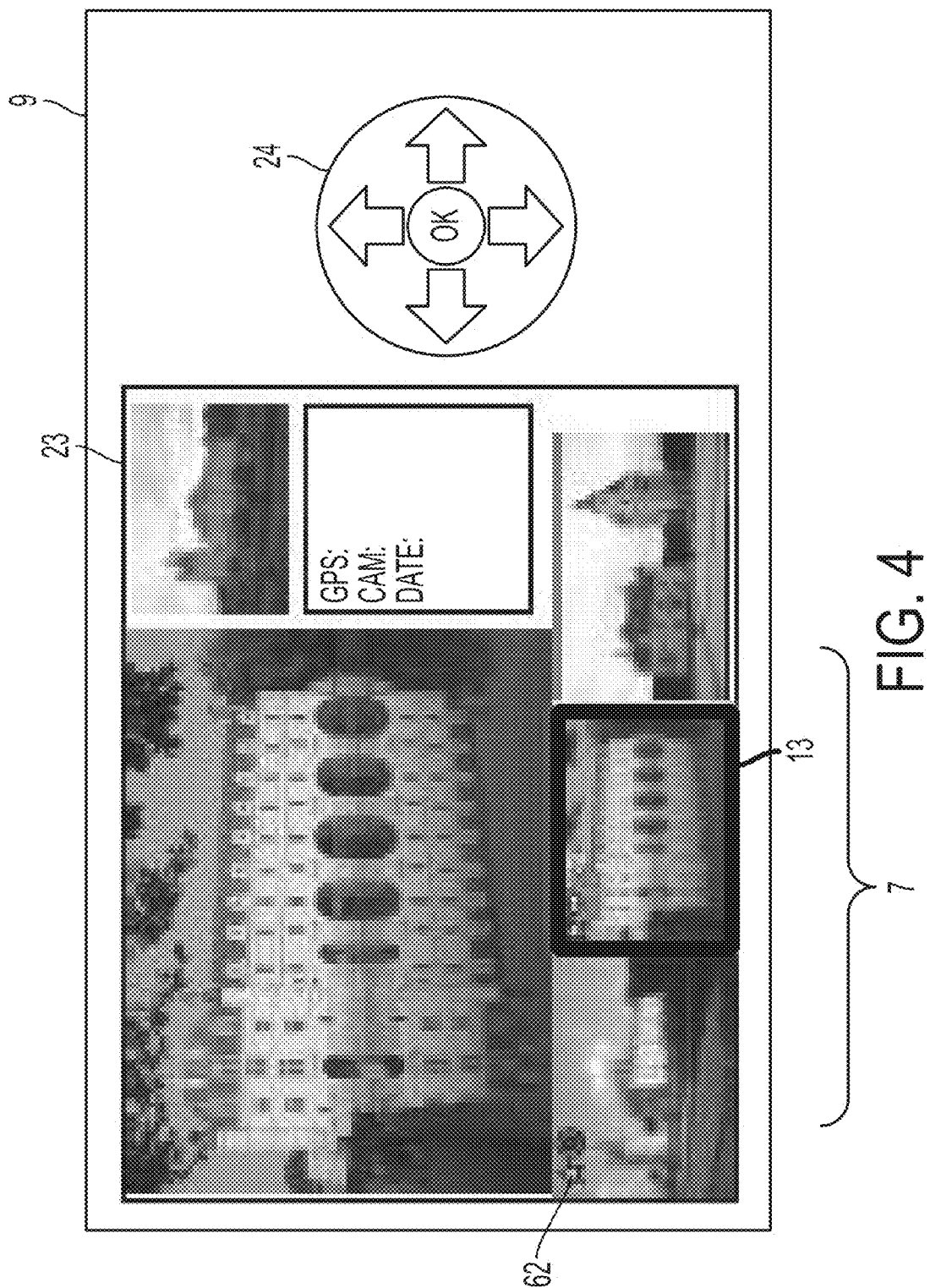
FIG. 4 illustrates an image capture device displaying retrieved images sorted in accordance with one aspect of the exemplary embodiment.

For example, the sorting component 37 can sort images 7 according to a measure of similarity computed, as illustrated in FIG. 4. In another embodiment, images 7 can be ordered according to their settings (e.g., flash, aperture, ISO speed, focal length, etc.). The settings are not necessarily those of the image capture device 9 with the image interface system 8. A photographer may have two cameras, one used to run the image interface system 8 and another (e.g., a digital or non-digital camera) for taking photographs.

In another embodiment, the images 7 may be arranged according to camera model in which they were respectively captured. In another embodiment, images 7 can be ordered according to quality, where highest rated images are returned first from the image database 2. In another embodiment, images 7 can be ordered according to the location in which they were respectively captured. This may be an option relying on a Global Positioning System (GPS) integrated in the image capture device 9. For devices without an integrated GPS, a geometrical engine 42 (FIG. 2) computes an approximated location of the user when a near-duplicate geographically-tagged image is retrieved in the database 2 via the search engine 41. Consequently, images taken from the locations closest to the user (e.g., where proximity is measured with respect to the current user position) are returned first to be presented in such order. The images within the database 2 can comprise metadata associated and stored therewith including a quality indication or score, and thus, highest ranked images may be returned first in order to be presented to the user accordingly. In another embodiment, images 7 may be ordered according to time/date information in which they were taken with those most closely resembling the current time and/or date being ranked highest. As stated above, various arrangements of the images 7 retrieved can be envisioned and are not limited to the examples herein or to any particular one sorted arrangement.

Once images 7 similar to the query image 12 are presented, the user selection component 30 of the system 8 is communicatively coupled to the display device 23 for receiving a user-selection of a model image 13 (i.e., a selected one of the similar images 7 presented) that is selected by the user (e.g., photographer). The user selection component 30, in addition to receiving the user's selection of a query image 12, may also be configured to receive a user selection of a particular one 13 of the retrieved images 7. This allows the system 8 to assist the user to capture a target image 1, which is the image that the user desires to capture, with guidance from the system 8.

The instruction generator 34 of the system 8 provides instructions to the display device 23 for such purposes as providing guidance to the user in capturing the target image 1 (e.g., of a landmark or scene) that is of improved quality, as compared to the query image 12 and similar in quality to the model image 13 selected by the user. The instructions provided may include photography tips for creating enhanced digital photography images, for example, and will be further discussed below.

The memory 15, 18, 22, 52 may represent any type of tangible computer readable medium such as random access memory (RAM), read only memory (ROM), magnetic disk or tape, optical disk, flash memory, or holographic memory. In one embodiment, the memory 15, 18, 22, 52 comprises a combination of random access memory and read only memory. In some embodiments, the processor and memory of system 8 or 10 may be combined in a single chip.

The digital processors 16, 19 can be variously embodied, such as by a single-core processor, a dual-core processor (or more generally by a multiple-core processor), a digital processor and cooperating math coprocessor, a digital controller, or the like. The digital processor 16, in addition to controlling the operation of the image capture device, executes instructions stored in memory 15 for performing part of the method outlined in FIG. 6, while digital processor 19, in addition to controlling the operation of the server, executes instructions stored in memory 18 for performing part of the method.

Figure 6:
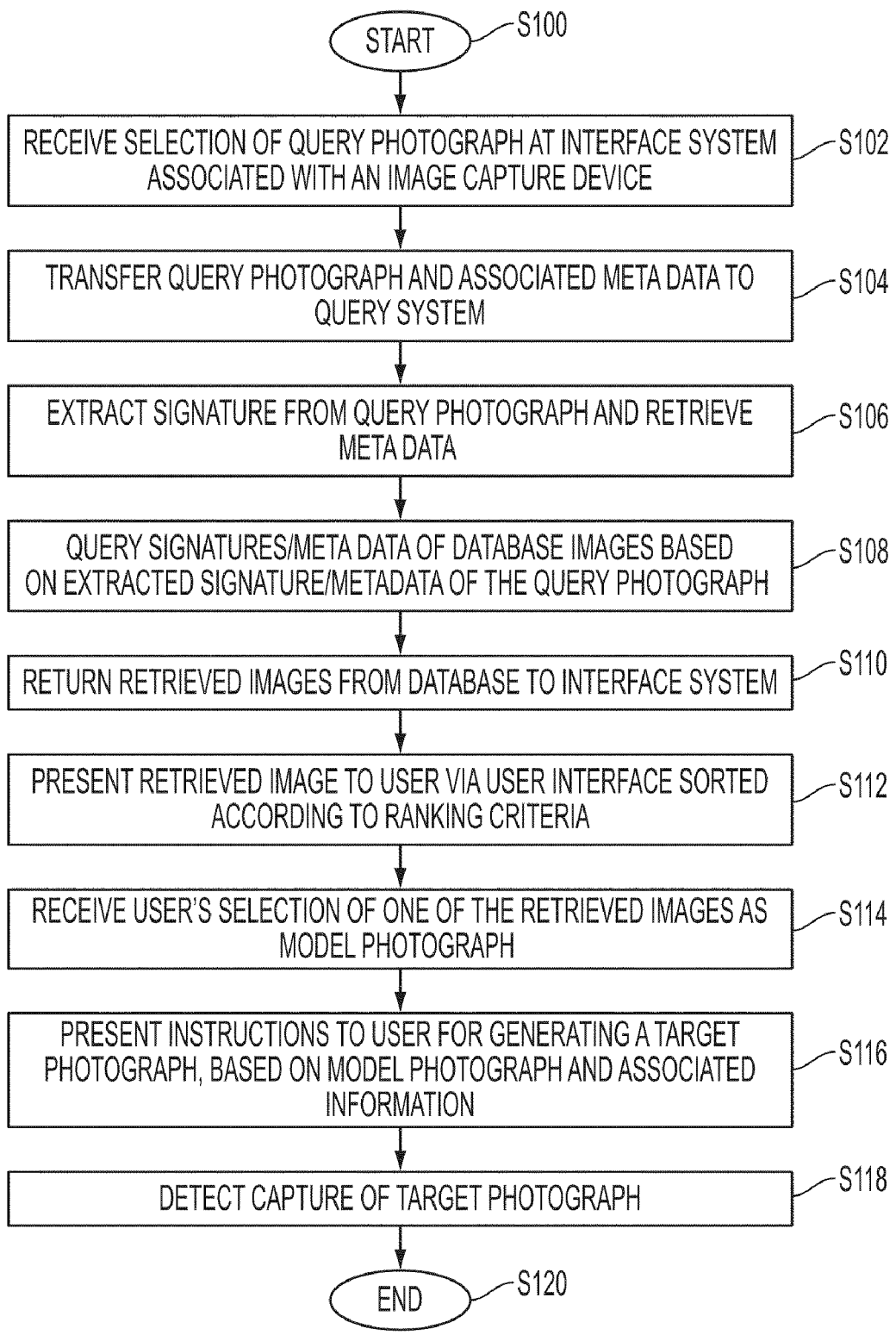
FIG. 6 illustrates a method for providing user assistance for taking a desired photograph in accordance with another aspect of the exemplary embodiment.

FIG. 6 illustrates an exemplary method for generating instructions for assisting a user in taking a high quality photo. The method begins at S100. While the method is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At S102, a user's selection of a query image 12 is received, e.g., by interface system 8. It may be appreciated that the method is not limited to a camera device or mobile, but can be implemented in any device for processing images. At S104, The query image 12 is transferred to the query system 10, together with corresponding information 35 associated with the image, such as metadata comprising a global positioning system (GPS) location, settings of an image capture device, model information of the image capture device, timing information, and/or any other information related to the query image 12.

At S106, a signature is extracted from the query photograph 12, as described above.

At S108 a query 53 is input by the server 11 to database 2 with search engine 41. The signature data and metadata associated with the image 12 with those of photographs 3 in the database 2.

At S110 the images 7 are retrieved by the server and having similar signatures and/or metadata. In one embodiment, the photograph images are retrieved with a quality indication, such as a score that has been assigned to the photo. For example, a quality indication can comprise an aesthetic score and an originality score. These scores can be based on a number of criteria, for example, the amount of positive feedback a photograph has received by other users of the database 2.

At S112 the photographs 7 retrieved with the query are returned to the interface 8.

At S114, at least some of the returned photographs 7 are presented to the user, e.g., in a sorted order that is based on ranking criteria. As noted above, the sorted order is the arrangement in which the photos are presented. They may be ranked at the user interface or retrieved in the ranked order after being ranked at the server 11. The criteria for ranking the images 7 may include one or more of a quality of the photos (e.g., by ranking with highest quality first), a similarity measure (e.g., most similar photos ranked highest), a location (e.g., by GPS location), settings (e.g., photos with most similar settings to the query photograph 12 are presented first), and/or time/date information (e.g., photos with time of day or time of year closest in time to the query photograph time/date are ranked highest). Various criteria may be utilized for presenting the ranked order of similar images 7 to the user. In one embodiment, the user can select any specific ordering to be presented. In other embodiments, the order of presenting may be a randomly presented ordering. The embodiments herein are not limited to any particular ranking or presentation order.

Figure 5:
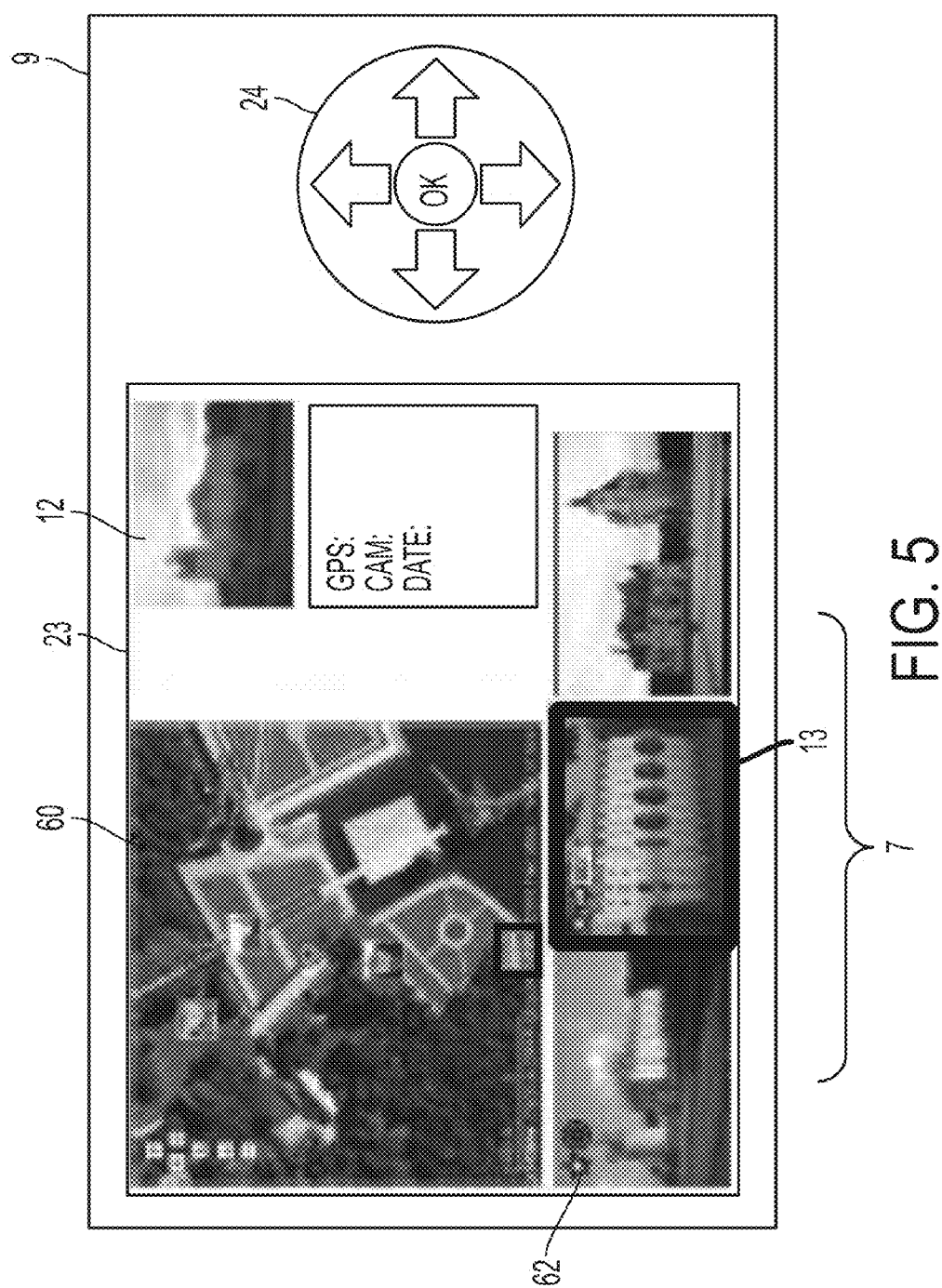
FIG. 5 illustrates an image capture device displaying retrieved images sorted in accordance with another aspect of the exemplary embodiment.

In one embodiment, the user can review the various images and select the model photograph 13 through various interfaces. For example, FIG. 4 illustrates a set of images 7 that are displayed in an order computed by ranking the images according to user preferences and constraints, for example, according to highest similarity to the query photo 12. The user may click on the image to be used as the model image 13, which is then enlarged. The images 7 may alternatively be ordered as a list of images with different settings, such as aperture, shutter speed, and/or focal length. Or, as shown in FIG. 5, the images 7 may be presented with a location on a map to indicate how to arrive at the appropriate location for photographing the landmark, for example. In one embodiment, clicking on an image in the list can show its position on the map 60 and clicking on a position on the map can show the closest image from that position. The images may also contain icons 62 to display the characteristics of the image, such as time of day, lighting conditions, camera settings, and the like. A star can indicate that an image is highly rated or is of highest quality.

At S114 a selection of a model photograph 13 is received from the user after selecting from among the similar images 7 presented.

At S116 the interface system 10 presents instructions to the user for taking the target photograph 1. The target photograph 1 can be the photograph that the user desires to take by modeling it on the model photograph 13 selected. At S118, the interface may detect that the user has captured the target image.

The method ends at S 120.

The method illustrated in FIG. 6 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or other non-transitory memory. In other embodiments, the method may be implemented in transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 6, can be used to implement the method for generating assistance (e.g., instructions, shooting tips, augmented reality assistance, etc.) to a user for taking a photograph.

Various aspects of the exemplary apparatus and method will now be described in greater detail.

The Image Database 2

Many quality images containing pictures of famous scenes and landmarks have been aggregated into databases, which are available to the public for their use and exposure. For example, many amateurs and professionals willingly share their best pictures through photo sharing websites. Comments and ratings of other viewers, which give an indication of the quality of an image, are also posted with these pictures See, e.g., Flickr Nikon Digital Learning Centre Group, Flickr 2009 at www.flickr.com/groups/nikondigitallearningcenter/, hosting many diverse groups and discussions for digital photography. Further, search engines can be modeled to recognize landmarks on a world scale by using object recognition and clustering techniques. A comprehensive list of landmarks, for example, can be mined from millions of GPS-tagged photos and from online touch guide web pages. Candidate images can be obtained for each landmark from websites or by querying an image search engine. Then, landmark visual models can be built by using image matching and clustering techniques (See, e.g., Van-Tao Zheng, Ming Zhao, Yang Song, H. Adam, U. Buddemeier, A. Bissacco, F. Brucher, Tat-Seng Chua, H. Neven, "Tour the World: Building a web-scale landmark recognition engine, IEEE Computer Society Conference (2009)). Landmark and scene recognition, e.g., by employing content analysis and/or geo-location detection can improve retrieval of relevant images.

Post processing, such as geometry verification can additionally be applied to boost the retrieval accuracy in a query. Various schemes can be applied to compute a geometric transformation between a query image and each of a short list of database images returned in the query.

An agglomerative hierarchical clustering on the photograph's GPS coordinates retrieved through the search engine 41 may also be performed. Geo-clustering and visual clustering techniques can be performed together. Then, text tags of each photograph in a visual cluster can further be extracted by filtering stop words and phrases. The frequency of n-grams of all tags in each visual cluster is computed. The resulting n-grams with the highest frequency are thus regarded as the landmark name for the visual cluster. See, e.g., Yan-Tao Zheng, Ming Zhao, Yang Song, H. Adam, U. Buddemeier, A. Bissacco, F. Brucher, Tat-Seng Chua, H. Neven, "Tour the World: Building a web-scale landmark recognition engine, IEEE Computer Society Conference (2009).

Assisting the User (S116)

The instruction generator 34 can provide guidance in multiple ways once the user has chosen the model image 13. The instructions can be generated based on a comparison between the signature and metadata associated with the image 13 chosen and the query photograph 12. If the chosen image contains GPS information, the system 8 can indicate to the user on a local map 60 where the model picture was taken. The generator may also provide directions to go to the location in which the target photograph 1 should be taken according to the model photograph 13.

GPS receivers are commonly built into mobile telephones and some cameras, allowing the user's position to be tracked as he moves towards the location where the target image 1 is to be taken. Corrective instructions may be provided by the interface system 8, if appropriate.

Instructions can be presented as tips for guidance in taking a similar photograph as the model photograph. For example, icons 62 may be configured to indicate various qualities of the photos presented to the user. An arrow can indicate a direction in which the user photographer should move to capture a similar angle. In addition, a number can be associated with the direction to provide how far the photographer should move.

In one embodiment, the interface system 8 presents instructions involving a geometrical transformation calculated from the image signature for the target photograph within a frame (e.g., on screen 24) of the image capture device 9 and the model photograph for a landmark, for example. A geometrical transformation can be computed between two matching objects 64, 66 e.g., a building or other structure 64 in the model photograph 13 and a computed similar structure 66 in a target photograph 1 being framed in the image capture device 9. This information can also be used in the instructions for generating the target image 1. This data can be displayed with estimation of translation and scaling parameters. Thus, the image capture device 9 can display a percentage or other measure of the extent of matching and hints can be generated in the instruction generator 34, such as, move left/right/zoom in/zoom out. In addition, when the target image being framed is computed to be close enough to the model photograph 13, a signal can also be displayed on the screen (e.g., a flashing icon and/or with a sound).

Figure 7:
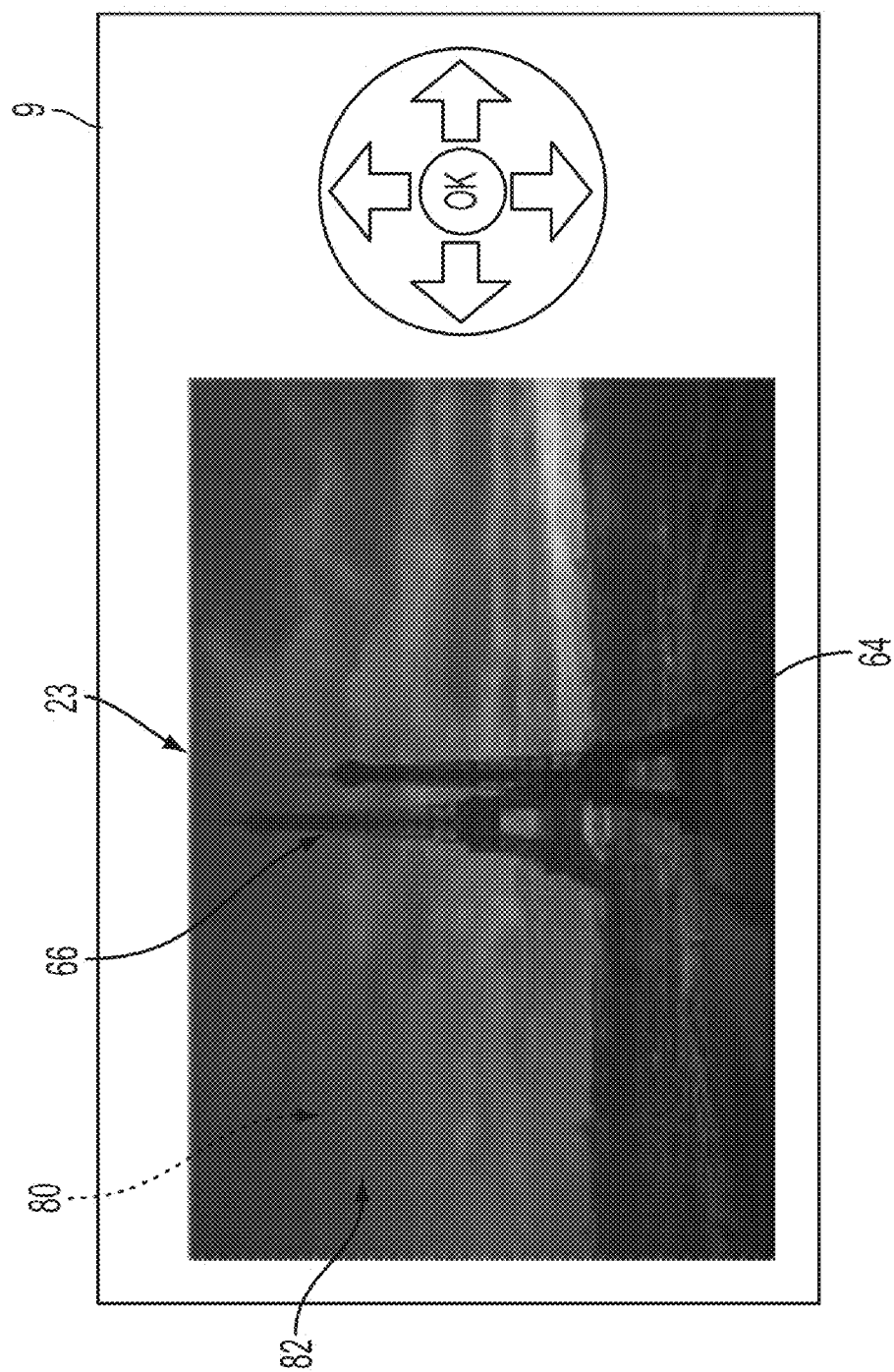
FIG. 7 illustrates an image capture device displaying an object of a selected image superimposed on a view from an image capture device.

In FIG. 7, for example, the model photograph is shown in an overlaid image that displays the landmark 64 (e.g., the Eiffel tower) or scene within a model photograph 13 in a background layer 80 with the potential target photograph within a frame of the image capture device being simultaneously displayed on a foreground layer 82 (or vice versa) using a transparency effect, which enables a see-through semi-opaque image to show an image behind it.

The geometric transformation can be any function mapping a part of one image onto another image or scene. Some examples include linear transformations and affine transformations such as rotations, reflections and translations. A translation, or translation operator, is an affine transformation of Euclidean space which moves every point by a fixed distance in the same direction. It can also be interpreted as the addition of a constant vector to every point, or as shifting the origin of the coordinate system. In other words, if v is a fixed vector, then the translation $T_v$ will work as $T_v(p)=p+v$. See, e.g., Yan-Tao Zheng, Ming Zhao, Yang Song, H. Adam, U. Buddemeier, A. Bissacco, F. Brucher, Tat-Seng Chua, H. Neven, "Tour the World: Building a web-scale landmark recognition engine, IEEE Computer Society Conference (2009).

In another embodiment, the assistance to the user can be provided through augmented-reality. Augmented Reality (AR) is a term for a live direct or indirect view of a physical real-world environment whose elements are augmented by virtual computer-generated imagery. In the case of AR, the augmentation can be in real-time and in semantic context with environmental elements. With the help of advanced AR technology (e.g., adding computer vision and object recognition) the information about the surrounding real world of the user becomes interactive and digitally usable. Artificial information about the environment and the objects in it can be stored and retrieved as an information layer on top of the real world view.

Instructions for generating the target photograph 1 can be provided through AR as one means of assisting the user. Aside from text based instructions that can be in the form of shooting tips, or a general assistance guide, AR may be enabled in the camera for displaying the pathway to a location for shooting the target photograph 1, especially when the model photograph 13 selected by the user is accompanied by GPS information or some other formatted information designation a position on a map of the landmark and/or scene to be photographed. See, e.g., "Mobile Augmented Reality Browser," at http://layar.com, providing an augmented reality application.

Furthermore, presenting instructions to the user for taking the target photograph 1 desired can be performed within the display device 23, which can be a double display or multiple display device. The model picture 13 chosen by the user from the similar images 7 retrieved may be displayed in one display, for example, and another display may serve the usual purpose of framing and shooting the target photograph 1. One display may be in the front of the camera 9 and another display on the back, such as an LCD screen or other type display, or side by side.

If multiple displays are not available to the device providing the instructions for taking the target photograph 1, a model image 13 may be displayed in the background 80 while the photograph being framed for shooting may be displayed in the foreground 82 using a transparency effect (FIG. 7). Thus, the user may decide when a picture being framed sufficiently matches the model image 13. In addition, the level of transparency may also be selectably varied by the user to suit desired purposes. By transparency, it is meant that the background image is at least partially visible through the foreground image.

In one embodiment, a percentage of a match can be displayed for a user to be assisted in matching the model photograph 13 with the view in the frame for taking the target photograph 1. Hints such as: left/right/zoom in/zoom out can be displayed in the display 24. Geometrical transformations can be calculated from the signature data retrieved with the similar images 7 from database 2. Thus, a geometrical transformation is calculated between the model image 13 and the image being framed to be the target photograph 1. This computation may include computing geometric transformation between two matching objects in the model image and the framed image in real time, for example. The calculation includes the estimation of translation and scaling parameters.

In another embodiment, user assistance provided (S116) is given in the form of instructions to guide the user among settings in which the model photograph 12 was taken. Information from the metadata retrieved with the image 13 from query 53, together with its extracted signature, provides information on camera model and associated settings. Settings may include settings such as aperture, shutter speed, focal length, manual vs. shutter priority selection, and other settings of the image capture device that captured the photograph.

Bracketing is the general technique of taking several shots of the same subject using different or the same camera settings. Bracketed photographs from database 3 may be presented to the user together to assist in determining appropriate settings.

The system 8, 10 may also be able to detect other photographic techniques which could be used in reproducing the model image 13, such as vignetting (bringing one part of the image into sharp focus while other parts are blurred), dealing with glare from snow or water, positioning the camera in the shade to avoid direct sunlight, and the like. See, e.g., "Digital Photography Tips," Adobe Systems (2008); "Flickr Nikon Digital Learning Centre Group," Flickr 2009 www.flickr.com/groups/nikondigitallearningcenter/, hosting many diverse groups and discussions for digital photography; and "Photo Tips & Techniques," Kodak (2009).

Providing Advanced Assistance

In some cases, the user may select a model photograph 13, but the interface system 8 determines that it is not possible for the user to take a similar target picture 1 under the surrounding circumstances. For example, the user is trying to reproduce a photograph 13 which was taken at dusk when it is the middle of the day or under cloudy conditions when the model photograph was taken in bright sunlight.

Using image categorization techniques, the categorizer 43, such as a classifier, may categorize an outdoor picture into a plurality of categories, e.g., three categories, such as a) broad daylight; b) sunrise/sunset; and c) night. Consequently, the system 14 detects a conflict between the query image 12 and the target photograph 1 to be taken. Using GPS location data, for example, in conjunction with the time or date information from metadata of the model photograph 13 the, system 14 retrieves the sunrise and sunset times on that day, as well as following days, in order to provide instructions to the user for a day to come back on and at what time, to be more likely to match the environmental conditions present when the model photograph 13 was captured.

Provision may also be made for the user to query the system 14 using the query photograph 12 of a landmark/scene taken at a cloudy/rainy time of day, or a time of day when weather conditions are not comparable with the model photograph 13 selected by the user. The categorizer 43 can categorize an outdoor picture, for example, into categories, such as the following: a) cloudy/rainy; b) sunny, and therefore, detect a conflict between the query photograph 12 and the model photograph 13 selected from the similar images 7 retrieved in the query 53. Therefore, using the GPS location of the image capture device 9, the system 14 can retrieve weather forecast information for the specific location over the network 6, for example, and provide instructions to the user as a suggestion to return to the landmark/scene at a specific time/date when weather conditions are forecasted to be improve.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for assisting a user in taking photographs comprising:
   receiving a query photograph comprising an image;
   with a processor, extracting an image signature from the query photograph based on content-related features extracted from patches of the image, the extracting of the image signature including extracting a descriptor from each patch, each descriptor comprising a feature vector or histogram, the image signature comprising a vectorial representation of the descriptors;
   querying a database of photographs based on the image signature to retrieve photographs similar to the query image;
   presenting at least a subset of the retrieved photographs for the user to select a model photograph from among the presented photographs;
   based on a user-selected model photograph, generating instructions for taking a target photograph; and
   presenting the instructions to the user for taking the target photograph.

2. The method of claim 1, wherein the presenting of the at least a subset of the images includes presenting images based on at least one sorting criterion.

3. The method of claim 1, wherein the sorting criterion is selected from the group consisting of a quality indication, a visual similarity, location information, setting information for an image capture device, timing information, and combinations thereof.

4. The method of claim 1, wherein the query photograph comprises a landmark or a scene.

5. The method of claim 1, wherein the query photograph comprises metadata, and wherein the querying of the database is based on at least some of the metadata.

6. The method of claim 5, wherein the metadata comprises at least one of: a global positioning system (GPS) location, settings of an image capture device which generated the photograph, model information of the image capture device, timing information, and information related to the query photograph.

7. The method of claim 1, wherein presenting the instructions comprises at least one of:
   a) where the model photograph is associated with a GPS location, at least one of:
      indicating to the user on a map a location where the model photograph was taken, and
      providing directions to that location;
   b) where the model photograph is associated with settings, providing suggestions to the user related to at least one setting for taking the target photograph, based on the settings of the model photograph; or
   c) presenting the model photograph in one display of a double display or displaying a landmark or scene within the model photograph in a background while the target photograph is concurrently displayed on the foreground using a transparency effect.

8. The method of claim 1, wherein presenting the instructions comprises computing geometrical transformation data between a view within a frame of an image capture device and the model photograph and at least one of:
   presenting directions for increasing a similarity level between the view and the model photograph to the user, and
   providing a signal when the view within the frame of the image capture device is determined to be substantially similar to the model photo.

9. The method of claim 1, wherein presenting the assistance comprises:
   detecting a conflict for taking the target photograph having a similar quality to the model photograph, based on time information associated with the model photograph, and
   proposing to the user a suitable future time to take the target photograph when environmental conditions are predicted to be similar to those when the model photograph was taken.

10. The method of claim 9, wherein the environmental conditions comprise at least one of an amount of sunlight and a weather condition.

11. The method of claim 1, wherein the querying of the database comprises comparing the image signature of the query photograph to image signatures of images in the database.

12. The method of claim 1 further comprising filtering the retrieved images based on at least one of a GPS location associated with the images and comments associated with the images which relate to at least one of a location of the image and a quality of the image.

13. The method of claim 1, wherein the image capture device comprises a camera or a mobile phone capable of communicating the query image and receiving retrieved images over a wireless network.

14. A computer program product comprising a non-transitory recording medium encoding instructions which, when executed by a computing device, perform the method of claim 1.

15. The method of claim 1, wherein the extracting an image signature includes extracting the descriptors from the patches based on at least two of texture, color, shape, and structure.

16. The method of claim 1, wherein the patches are obtained by image segmentation, by applying specific interest point detectors, by considering a regular grid, or by random sampling.

17. The method of claim 1, wherein the extracting an image signature comprises assigning each of the descriptors to its closest visual word in a previously trained vocabulary of visual words or to all the visual words in a probabilistic manner.

18. The method of claim 17, wherein the extracting an image signature from the query photograph includes modeling the query image as a set of mixture weights, one for each of a set of Gaussian mixture models.

19. The method of claim 1, wherein the descriptors comprise histograms of gradients.

20. The method of claim 1, wherein the querying of the database of photographs based on the image signature to retrieve photographs similar to the query image comprises computing a vector set comparison measure based on the respective image signatures of the query image and database photographs.

21. A system for assisting a user in taking photographs, comprising:
   memory which stores:
      a user selection component for receiving a user's selection of a query photograph and of a model photograph;
      an image shuttle for transferring the query photograph to an associated query system for querying a database based on an image signature extracted from the query image and for receiving images retrieved from the database in response to the query, the image signature comprising a vectorial representation of descriptors extracted from patches of the query image extracted by assigning each of the descriptors to its closest visual word in a previously trained vocabulary of visual words or to all the visual words in a probabilistic manner;

a display generator for generating a display of at least a subset of the retrieved images on an associated display device from which the model photograph is selected; and an instruction generator configured to present instructions to the user for taking a target photograph based on the selected model photograph; and a processor in communication with the memory for implementing the user selection component, image shuttle, display generator, instruction generator.

22. The system of claim 21, wherein the memory further stores a sorting component for sorting the retrieved photographs based on at least one of a quality indication, a similarity weighting, a location information, setting information for an image capture device, and a timing information related to the query photograph.

23. The system of claim 21, wherein the query system queries the database based on metadata associated with the image.

24. The system of claim 21, wherein the image signature further comprises information variables having at least one of a viewpoint, zooming, light, occlusion and quality information.

25. The system of claim 21, further comprising a geometrical transformation engine configured to compute a geometrical transformation between a view in a frame of an image capture device and the model photograph and for assisting a user in aligning the view with the model photograph.

26. The system of claim 21, further comprising an image categorization mechanism coupled to the instruction generator and configured to categorize the model photograph and the target photograph into a time of day, and/or weather information for providing suggestions to the user.

27. An image capture device comprising the system of claim 21, and the display device.

28. The image capture device of claim 27, wherein the image capture device comprises a camera or a mobile phone capable of communicating the query photograph and receiving the retrieved photographs over a wireless network.

29. A method for assisting a user in taking photographs executed by at least one processor with at least one memory storing executable instructions for performing the method, comprising:

at a computer device, receiving a selected query photograph submitted from an image capture device remote from the computer device, the photograph comprising at least one digital image;

extracting information from the received query photograph, the information including an image signature derived from the digital image;

retrieving photographs from a database based on a comparison of the information extracted from the query photograph with information extracted from photographs in the database, the information extracted from photographs in the database including, for each photograph, an image signature derived from he digital image;

presenting at least a subset of the retrieved photographs for a user of the image capture device to select a model photograph therefrom;

receiving a selection of a model photograph from among the presented photographs; and generating instructions to guide the user for taking a target photograph comprising a similar quality to the selected model photograph, including calculating a geometrical transformation between the model photograph and an image being framed by the image capture device to be the target photograph.

30. The method of claim 29, wherein the information further comprises metadata associated with the query image and database images respectively.

* * * * *